United States Patent
Ikeda et al.

(10) Patent No.: US 8,199,954 B2
(45) Date of Patent: Jun. 12, 2012

(54) IMAGE CAPTURING APPARATUS

(75) Inventors: Shingo Ikeda, Tama (JP); Hideyuki Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 12/525,244

(22) PCT Filed: Dec. 2, 2008

(86) PCT No.: PCT/JP2008/072217
§ 371 (c)(1),
(2), (4) Date: Jul. 30, 2009

(87) PCT Pub. No.: WO2009/075241
PCT Pub. Date: Jun. 18, 2009

(65) Prior Publication Data
US 2010/0091998 A1    Apr. 15, 2010

(30) Foreign Application Priority Data

Dec. 12, 2007 (JP) ................................. 2007-320957
Dec. 12, 2007 (JP) ................................. 2007-320958

(51) Int. Cl.
*H04R 9/08* (2006.01)
(52) U.S. Cl. ........ 381/355; 381/356; 381/361; 381/362; 381/363; 381/365; 348/231.4

(58) Field of Classification Search ................. 381/355, 381/356, 361, 362, 363, 365, 26; 348/231.4
See application file for complete search history.

(56) References Cited

U.S. PATENT DOCUMENTS
7,224,385 B2 * 5/2007 Shinada ................... 348/207.99

FOREIGN PATENT DOCUMENTS

| JP | 2000-224688 | 8/2000 |
| JP | 2002-232989 | 8/2002 |
| JP | 2003-284179 | 10/2003 |
| JP | 2006-314078 | 11/2006 |

* cited by examiner

*Primary Examiner* — Vivian Chin
*Assistant Examiner* — Paul Kim
(74) *Attorney, Agent, or Firm* — Cowan, Liebowitz & Latman, P.C.

(57) ABSTRACT

The use of sound signals from sounds collected by four non-directional sound collectors facilitates calculation for generating surround sound signals, for example, when multi-channel surround sound signals are generated, and prevents the size of the entire apparatus from increasing. Surround sound signals are generated from sound signals of sounds collected by a microphone unit composed of a first sound collector, a second sound collector disposed posterior to the first sound collector, a third sound collector, and a fourth sound collector.

24 Claims, 7 Drawing Sheets

IMAGE CAPTURING APPARATUS

TECHNICAL FIELD

The present invention relates to an image capturing apparatus, and more particularly, to an image capturing apparatus that is able to process sound signals.

BACKGROUND ART

Conventionally, video cameras and the like as image capturing apparatuses for processing sound signals are known. Video cameras collect sounds from subjects with the use of a sound collector (microphone), and record the sounds together with video.

Some of these video cameras use sound signals collected by three non-directional sound collectors to generate 2-channel stereophonic sound signals, for example, see Japanese Patent Laid-Open No. 2000-224688.

In recent years, the development of sound technology and sound replay devices has also allowed us to listen to multi-channel sounds such as 5.1 channel sounds, not stereophonic sounds, in the case of DVDs and the like.

The present invention has as its object to provide an image capturing apparatus which facilitates calculation for generating surround sound signals when sound signals collected by four non-directional sound collectors are used to generate, for example, multi-channel surround sound signals. Further, the present invention also has as its object to provide an image capturing apparatus which can prevent the size of the entire apparatus from being increased by reducing the area of the arrangement of the above four non-directional sound collectors.

DISCLOSURE OF INVENTION

In order to solve the problems described above, according to one aspect of the present invention, there is provided an image capturing apparatus including an image capturing unit for capturing an optical image of a subject ahead, the image capturing apparatus comprising: a microphone unit for collecting a surround sound; and a generator for generating a multi-channel sound signal, based on a sound collected by the microphone unit, wherein the microphone unit comprises a first sound collector, a second sound collector disposed posterior to the first sound collector, a third sound collector, and a fourth sound collector, and the fourth sound collector is disposed inside a triangle formed by the first sound collector, the second sound collector, and the third sound collector as vertexes, and wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the fourth sound collector and a sound signal of a sound collected by the second sound collector, generates a fourth channel sound signal from a sound signal of a sound collected by the second sound collector and a sound signal of a sound collected by the third sound collector, and generates a fifth channel sound signal from a sound signal of a sound collected by the third sound collector and a sound signal of a sound collected by the first sound collector.

According to another aspect of the present invention, there is provided an image capturing apparatus including an image capturing unit for capturing an optical image of a subject ahead, the image capturing apparatus comprising: a microphone unit for collecting a surround sound; and a generator for generating a multi-channel sound signal, based on a sound collected by the microphone unit, wherein the microphone unit comprises a first sound collector, a second sound collector disposed posterior to the first sound collector, and a third sound collector and a fourth sound collector both disposed on the right-hand or left-hand side of a line connecting the first sound collector and the second sound collector, the third sound collector and the fourth sound collector disposed with displacement in the anterior-posterior direction, and wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the third sound collector and a sound signal of a sound collected by the second sound collector, generates a fourth channel sound signal from a sound signal of a sound collected by the second sound collector and a sound signal of a sound collected by the fourth sound collector, and generates a fifth channel sound signal from a sound signal of a sound collected by the third sound collector and a sound signal of a sound collected by the first sound collector.

According to still another aspect of the present invention, there is provided an image capturing apparatus including an image capturing unit for capturing an optical image of a subject ahead, the image capturing apparatus comprising: a microphone unit for collecting a surround sound; and a generator for generating a multi-channel sound signal, based on a sound collected by the microphone unit, wherein the microphone unit comprises a first sound collector, a second sound collector disposed posterior to the first sound collector, a third sound collector, and a fourth sound collector, and wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the fourth sound collector and a sound signal of a sound collected by the second sound collector, generates a fourth channel sound signal from a sound signal of a sound collected by the second sound collector and a sound signal of a sound collected by the third sound collector, and generates a fifth channel sound signal from a sound signal of a sound collected by the third sound collector and a sound signal of a sound collected by the first sound collector.

Further features and advantages of the present invention will become apparent from the following description of the preferred embodiments with reference to the attached drawings.

BEST MODE FOR CARRYING OUT THE INVENTION

The embodiments will be described with reference to the drawings.

First Embodiment

A video camera will be described which is capable of generating multi-channel sound signals on the basis of sound signals input from four sound collectors.

Figure 1:
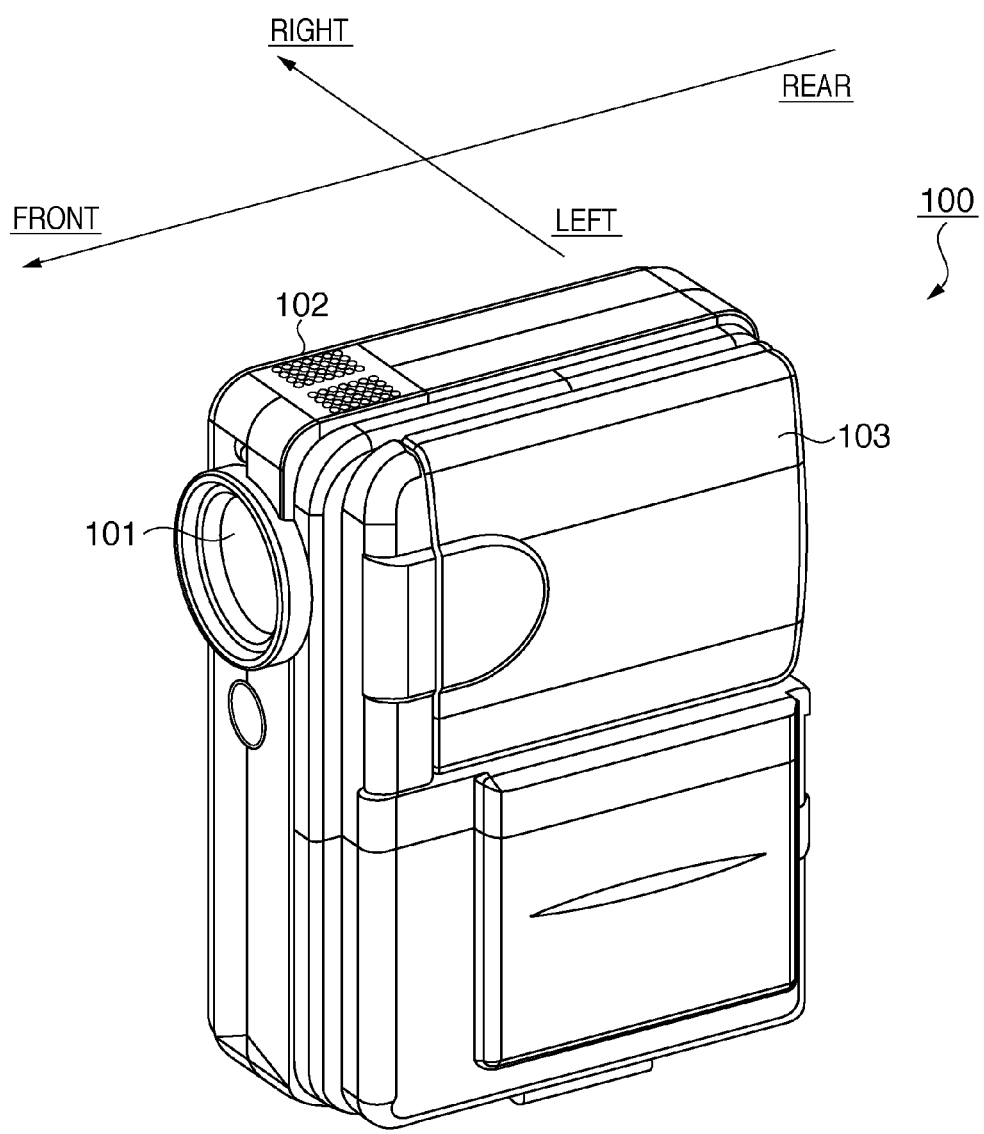
FIG. 1 is a perspective view of a video camera to which the present invention is applied.

FIG. 1 is a perspective view of a video camera according to the present embodiment.

In FIG. 1, reference numeral 100 denotes the video camera according to the present embodiment. Reference numeral 101 denotes a photographing lens for capturing optical images of subjects. Reference numeral 102 denotes a microphone unit which incorporates therein four sound collectors for collecting surround sounds. The arrangement of the sound collectors will be described later. Reference numeral 103 denotes a display unit for, during shooting, displaying video of optical images of subjects captured by the photographing lens 101 and processed by a video processing unit 206 to be described later, and for during replay, displaying video processed by a video replay processing unit 211 to be described later, as well as menu screens and the like.

In the present embodiment, the side on which the photographing lens 101 is disposed is considered to be the front of the video camera 100 as shown in FIG. 1.

Figure 2:
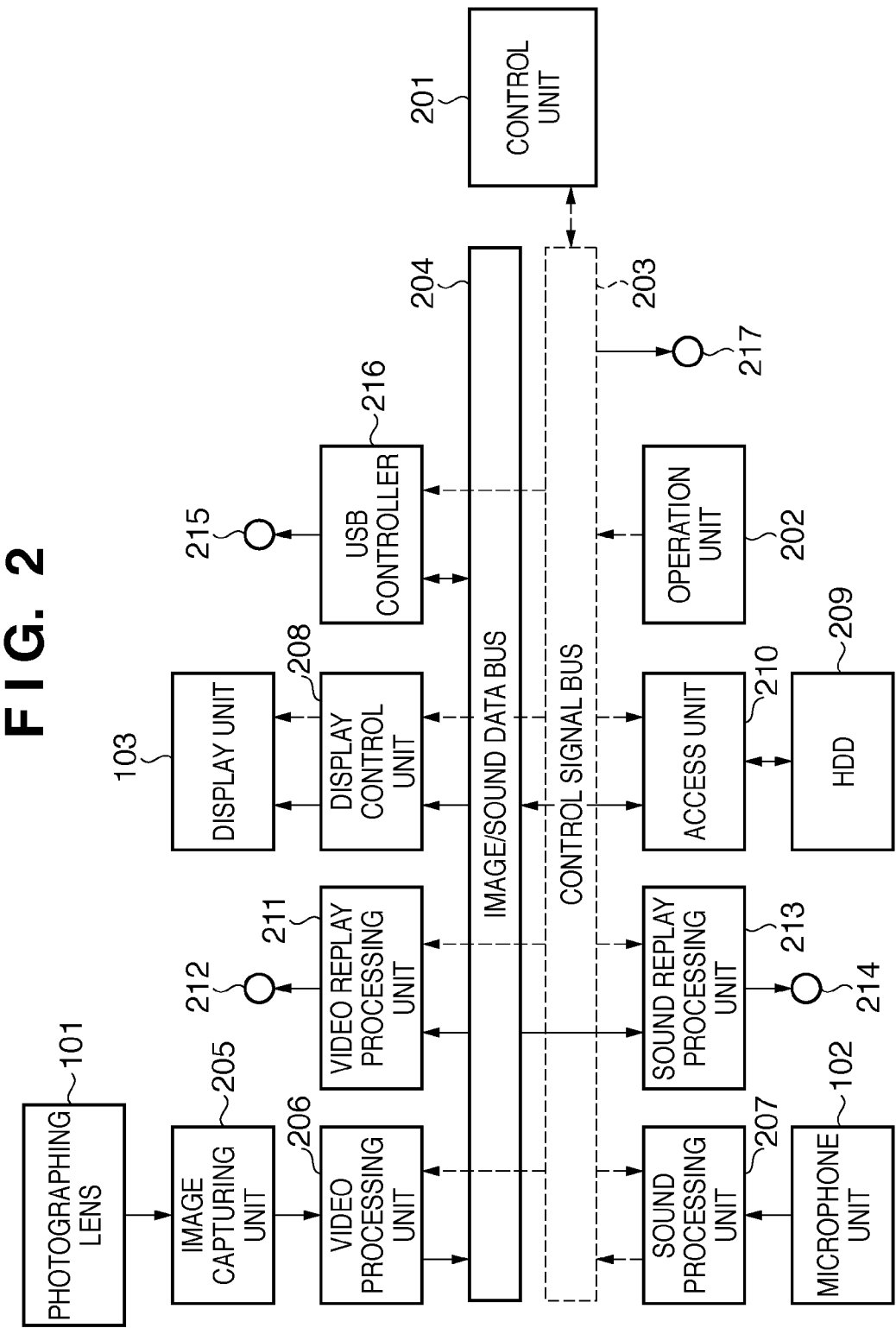
FIG. 2 is a block diagram of the video camera to which the present invention is applied.

FIG. 2 is a block diagram of the video camera 100 in FIG. 1.

In FIG. 2, reference numeral 201 denotes a control unit for controlling each block depending on a variety of functions of the video camera 100. Reference numeral 202 denotes an operation unit for inputting external requests into the video camera 100. Reference numeral 203 denotes a control signal bus through which control signals from the control unit 201, request signals from the operation unit 202, and the like are transmitted. Reference numeral 204 denotes an image/sound data bus through which image data and sound data for each block are transmitted.

Reference numeral 205 denotes an image capturing unit comprises an aperture for controlling the amount of light from the photographing lens 101, an image sensor for converting optical images into electrical signals, and the like. Reference numeral 206 denotes a video processing unit for carrying out processing required for a video recording scheme, such as adjusting video signals obtained from the image capturing unit 205 to appropriate signal levels, converting the video signals into digital data, and recording the digital data one frame at a time.

Reference numeral 207 denotes a sound processing unit for carrying out processing of amplifying sound signals obtained by the microphone unit 102 to appropriate levels and of converting the sound signals to digital data. The sound processing unit 207 carries out processing such as converting sound signals obtained from the four sound collectors of the microphone unit 102 to, for example, 5.1 channel sound data. The sound processing unit 207 will be described in more detail later.

Reference numeral 208 denotes a display control unit for controlling display on the display unit 103. The display control unit 208 displays, on the display unit 103, information depending on a variety of modes, in response to requests from the control unit 201.

Reference numeral 209 denotes a hard disk (hereinafter, referred to as a HDD) as a recording medium for recording image data obtained from the video processing unit 206, sound data obtained from the sound processing unit 207 and other data, associated with each other as needed. Reference numeral 210 denotes an access unit for accessing the HDD 209 to read and write the video data, sound data, and other data described above, and the like.

Reference numeral 211 denotes a video replay processing unit for processing, in accordance with a video recording scheme, video data in the HDD 209 read out by the access unit 210, and converting the processed video data into a predetermined format. Reference numeral 212 denotes a video output terminal for outputting the video signals replayed by the video replay processing unit 211 to the outside.

Reference numeral 213 denotes a sound replay processing unit for replaying, in accordance with a video recording scheme, sound data in the HDD 209 read out by the access unit 210. Reference numeral 214 denotes a sound output terminal for outputting the sound signals replayed by the sound replay processing unit 213 to the outside.

Reference numeral 215 denotes a USB terminal for communicating with an external device such as a PC or exchanging video data, sound data, and the like recorded on the HDD 209 with an external device. Reference unit 216 denotes a USB controller for controlling exchange of data between the USB terminal 215 and the connected external device.

Reference numeral 217 denotes a transmission terminal for transmitting control signals to an external device.

First, basic shooting operation with the video camera 100 according to the present embodiment will be described.

In response to the operated power switch of the operation unit 202, the video camera 100 is brought into a stand-by state for shooting. In this state, the user operating a shooting button of the operation unit 202 requests the video camera 100 to start to shoot moving images. In response to this request for starting to shoot moving images, the control unit 201 transmits request signals for the start of shooting to the image capturing unit 205, the video processing unit 206, and the like.

When shooting is started, the image capturing unit 205 controls, with the use of the aperture, the amount of light for optical images of subjects captured by the photographing lens 101, and converts the controlled amount of light into electrical signals with the use of the image sensor. Then, the converted electrical signals are adjusted to appropriate levels and converted into digital data in the video processing unit 206. Then, the video signals obtained by being converted into digital data are adjusted to an appropriate number of pixels by a circuit for adjusting the number of pixels or the like of the video processing unit 106, and subjected to compression coding in accordance with a predetermined video recording scheme to obtain video data.

Further, the sound processing unit 207 amplifies four sound signals collected by the four sound collectors of the microphone unit 102 to appropriate levels. Then, these four sound signals are converted into digital data, for example, subjected to processing required by the sound recording scheme, such as converting the digital data into 5.1 channel sound data, to obtain sound data.

Then, the control unit 201 combines the video data described above with the sound data described above to form a data stream, and outputs the data stream to the access unit 210. The access unit 210, on the basis of the request from the control unit 201, starts to write the data stream of the video data and sound data into the HDD 209 as one moving image file, under file system management such as UDF or FAT. The file system means a structural system composed of management information for carrying out file management and file data. Standardizing the file system also allows for recording and replaying on different storage media or on different recording and playback devices.

The data stream may be displayed on the display unit 103 via the display control unit 208, if necessary.

Then, when the user again operates the shooting button of the operation unit 202, the control unit 201 transmits, in response to the request for the end of shooting of moving images, request signals for the end of shooting to the image capturing unit 205, the video processing unit 206, and the like.

In response to the receipt of the request signals for the end of shooting moving images, the image capturing unit 205 and the video processing unit 206 end the shooting operation. The access unit 210 writes, based on the request from the control unit 201, a series of video data and sound data recorded from the start of shooting to the end of shooting into the HDD 209 as one file, and ends the recording operation. The control unit 201 brings the video camera 100 into a stand-by state for shooting.

Next, normal replay operation with the video camera 100 according to the video camera 100 will be described.

The control unit 201 controls the access unit 210 in response to the selection of a replay mode by a selection switch of the operation unit 202, so as to read out video data and still image data from the HDD 209. Then, the control unit 201 controls the display control unit 208 so as to display on the display unit 103 a thumbnail screen in which thumbnails of the read video data and still image data are arranged or to display on the display unit 103 the file names of the video data and still image data. Further, the display control unit 208 may be controlled so as to display on the display unit 103 video data, still image data, or the like obtained in the last shooting.

Then, with the thumbnail screen displayed, when the user operates the operation unit 202 to request replay of video data or still image data, the control unit 201 controls each block so as to replay the requested image data.

In the case of replaying video data, the control unit 201 separates, in response to the request from the operation unit 202, contents data read from the HDD 209 into sound data and video data. Then, the amount of decoded information on the video data is expanded in the video replay processing unit 211, and displayed on the display unit 103 as video by the display control unit 208. In this case, since the video camera 100 is configured so that video signals are also output from the video terminal 212, a device which is able to display video, connected via the video terminal 212, can display the video. The sound data is transmitted to the sound replay processing unit 213, and the amount of decoded information on the sound data is expanded and converted into 5.1 channel surround sound data or surround sound signals, and output from the sound terminal 214, thereby resulting in sound output from a device which is able to output sounds, connected to the sound terminal 214.

Now, the configurations of the microphone unit 102 and the sound processing unit 207 according to the present embodiment will be described in detail with reference to FIG. 3.

Figure 3:
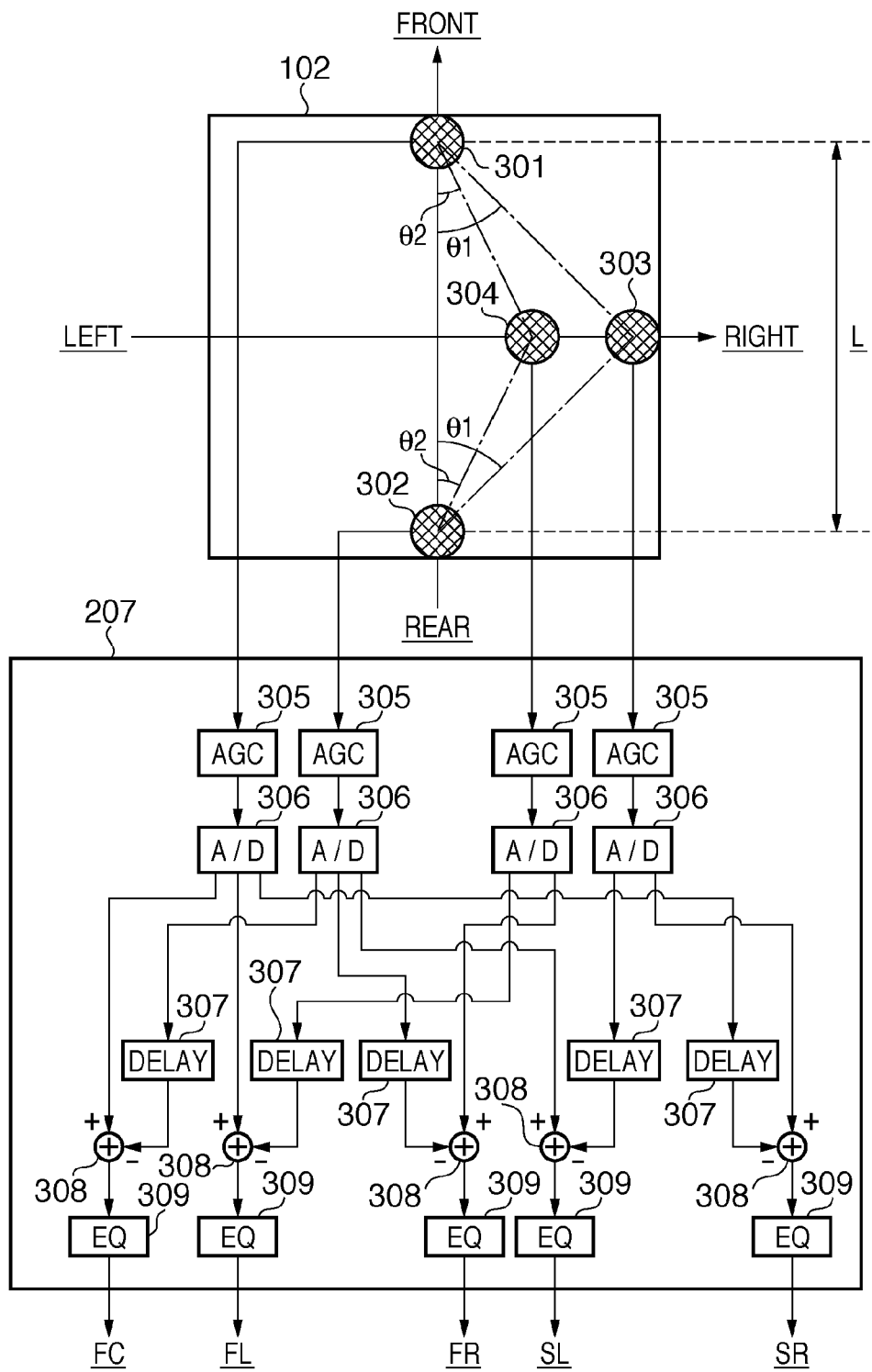
FIG. 3 is a diagram for explaining details of a microphone unit and a sound processing unit of a video camera according to a first embodiment.

FIG. 3 shows the microphone unit 102 of the video camera 100 in FIG. 1 as viewed from above. The sound processing unit 207 generates 5.1 channel surround sounds. Description of generation of subchannel sound signals corresponding to sounds of low-frequency components will be omitted here.

First, the microphone unit 102 will be described. Reference numerals 301 to 304 denote sound collectors. Each of the sound collectors has substantially non-directional sound collecting characteristics.

The sound collector 301 is anteriorly disposed in the image capturing direction of the video camera 100 in the microphone unit 102. The sound collector 302 is posteriorly disposed in the image capturing direction of the video camera 100 in the microphone unit. Further, the sound collector 302 is disposed posterior to the sound collector 301 on a line substantially parallel to the optical axis of the photographing lens 101 and transmitted through the sound collector 301, where a distance between the sound collector 301 and the sound collector 302 is denoted by L. The distance L is, for example, on the order of 14 mm.

The sound collector 303 is disposed at a vertex angle of substantially an isosceles triangle with the sound collector 301 and the sound collector 302 as vertexes and with the line connecting the sound collector 301 and the sound collector 302 as a base. In the present embodiment, the sound collector 303 is disposed on the right-hand side of the line connecting the sound collector 301 and the sound collector 302. The sound collector 304 is disposed at a vertex angle of substantially an isosceles triangle with the sound collector 301 and the sound collector 302 as vertexes and the line connecting the sound collector 301 and the sound collector 302 as a base. The sound collector 304 is also disposed inside the triangle with the sound collector 301, the sound collector 302, and the sound collector 303 as vertexes.

In the present embodiment, in the isosceles triangle with the sound collector 303 as a vertex, the angles at the vertexes of the sound collector 301 and the sound collector 302 are denoted by θ1, and the sound collectors are disposed to form the angle θ1 approximately from 60 degrees to 80 degrees. Further, in the isosceles triangle with the sound collector 304 as a vertex, the angles at the vertexes of the sound collector 301 and the sound collector 302 are denoted by θ2, and the sound collectors are disposed to form the angle θ2 of approximately 30 degrees.

Furthermore, in the present embodiment, the plane made by the sound collector 301, the sound collector 302, and the sound collector 303 is made to be substantially parallel to the bottom surface of the video camera 100. In addition, the plane made by the sound collector 301, the sound collector 302, and the sound collector 304 is also made to be substantially parallel to the bottom surface of the video camera 100.

Next, the sound processing unit 207 will be described. Reference numeral 305 denotes an automatic gain controller (hereinafter, referred to as an AGC) for adjusting sound signals collected by each sound collector to appropriate levels. Reference numeral 306 denotes an AD converting unit (hereinafter, referred to as A/D) for converting the sound signals adjusted by the AGC 305 to the appropriate levels, from analog data to digital data. Reference numeral 307 denotes a delay unit for delaying input sound data. Reference numeral 308 denotes a subtracter for subtracting the sound data delayed by the delay unit 307 from sound data which is not delayed. Reference numeral 309 denotes an equalizer (hereinafter, referred to as EQ) for attenuating high-frequency components.

Now, a procedure will be described for generating 5-channel surround sound data from sound signals obtained from the four substantially non-directional sound collectors in the sound processing unit 207.

A front center channel (FC) is generated from a sound signal obtained from the sound collector 301 and a sound signal obtained from the sound collector 302. A front left channel (FL) is generated from a sound signal obtained from the sound collector 301 and a sound signal obtained from the sound collector 304. A front right channel (FR) is generated from a sound signal obtained from the sound collector 302 and a sound signal obtained from the sound collector 304. A surround left channel (SL) is generated from a sound signal obtained from the sound collector 302 and a sound signal obtained from the sound collector 303. A surround right channel (SR) is generated from a sound signal obtained from the sound collector 301 and a sound signal obtained from the sound collector 303.

Taking the front center channel (FC) as an example, a method will be described for generating sound data for individual channels of 5-channel surround sound data.

As described above, the front center channel (FC) is generated from a sound signal obtained from the sound collector 301 and a sound signal obtained from the sound collector 302. Specifically, the front center channel (FC) is generated from sound data obtained by delaying a sound signal obtained from the sound collector 302 by a phase $\phi 1$, and from sound data obtained from the sound collector 301. A specific calculation method will be described below.

The sound processing unit 207 is configured such that: the sound signal obtained from the sound collector 301 is adjusted to a sound of an appropriate level by the AGC 305, and converted to first sound data by the A/D 306; the sound signal obtained from the sound collector 302 is adjusted to a sound of an appropriate level by the AGC 305, converted to second sound data by the A/D 306, and delayed by the delay unit 307; and then, the second sound data is subtracted from the first sound data by the subtracter 308 to generate a front center channel (FC) sound.

Now, attention is focused on input of a sound with a sine wave sin ωt from a sound source A to the video camera 100. It is assumed that this sound is input at an angle X when the right-hand side refers to 0 degree, and that the sound source A is located a sufficient distance with respect to the distance L between the sound collector 301 and the sound collector 302. If the sound source is located anterior to the video camera 100, a sound will be input to the sound collector 301, and then input to the sound collector 302. The distance difference from the sound source A to each microphone is represented by a general formula, the following formula (1):

$$(\text{Distance Difference}) = L \times \sin X = L \sin X \tag{1}$$

When the sound velocity is denoted by c, the wavelength of the sound with sin ωt can be obtained from the following formula (2):

$$(\text{Wavelength of Sound}) = c \div (\omega/2\pi) = 2\pi c/\omega \tag{2}$$

When the time until the sound input to the sound collector 301 is input to the sound collector 302 is represented with a phase difference $\phi x$ of the sound with sin ωt, the phase difference $\phi x$ is represented by the following formula (3):

$$\phi x = L \sin X \div (2\pi c/\omega) \times 2\pi = (L\omega \sin X)/c \tag{3}$$

The sound with the sine wave sin ωt, output from this sound source, is converted to a sound signal a by the sound collector 301. The sound signal a is represented by the following formula (4):

$$a = \alpha \sin \omega t \tag{4}$$

where α is an amplitude of the sound signal a.

The sound with the sine wave sin ωt, output from the sound source, is converted to sound signal b by the sound collector 302 behind the sound collector 301. The sound signal b is represented by the following formula (5):

$$b = \beta \sin(\omega t + \phi x) \tag{5}$$

where β is an amplitude of the sound signal b.

Further, the delay unit 307 delays the sound signal obtained from the sound collector 302 by a phase $\phi 1$. Thus, the sound data b' delayed by the delay unit 307 is represented by the following formula (6):

$$b' = \beta \sin(\omega t + \phi x + \phi 1) \tag{6}$$

From the formulas (4) and (6), the sound data output from the subtracter 308 is represented by the following formula (7):

$$a - b' = \sin \omega t - \beta \sin(\omega t + \phi x + \phi 1) \tag{7}$$

Now, attention is focused on a case in which X is 270 degrees. In this case, when the time until the sound input to the sound collector 301 is input to the sound collector 302 is represented with a phase difference $\phi b$ of the sound with sin ωt, the phase difference $\phi b$ is represented by the following formula (8):

$$\phi b = -(L\omega)/c \tag{8}$$

When X is 270 degrees, the formula (7) is represented as the following formula (9):

$$a - b' = \alpha \sin \omega t - \beta \sin(\omega t + \phi b + \phi 1) \tag{9}$$

In the description here, since it is desired to generate a front center channel (FC) sound, it is necessary to reduce the sensitivity to sounds from the rear. More specifically, in a case in which the sound source is posteriorly located (X is 270 degrees), the output of the formula (9) is made to be 0. Thus, the formula (9) can be rewritten as the following formula (10):

$$0 = \beta \sin \omega t - \beta \sin(\omega t + \phi b + \phi 1) \tag{10}$$

In order for the above formula (10) to be true, the formula may be set so that $\phi 1 = -\phi b$. Thus, $\phi 1$ is represented by the following formula (11):

$$\phi 1 = (L\omega)/c \tag{11}$$

From the formulas (7) and (11), the general formula which represents a front center channel (FC) sound is represented by the following formula (12):

$$(FC) = a - b' = \alpha \sin \omega t - \beta \sin(\omega t + \phi x + \phi 1) = \\ \alpha \sin \omega t - \beta \sin(\omega t + L\omega(\sin X + 1)/c) \tag{12}$$

Further, in the EQ 309, high-frequency components are attenuated, as needed, to output sound data with great directivity. Thus, in the manner described above, a front center channel (FC) sound is obtained.

In the description above, a method has been described in which the front center channel (FC) is taken as an example to generate 5-channel sound data. However, the other channels can be obtained in a similar way. Polar patterns of 5-channel sounds calculated in accordance with this method are shown in FIGS. 4A to 4E. In FIGS. 4A to 4E, since the sound source is at a sufficient distance from the sound correctors 301 to 304, it is assumed that α is nearly equal to β.

Figure 4A:
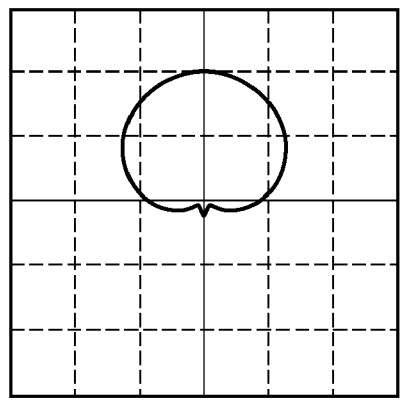
FIGS. 4A to 4E are diagrams illustrating polar patterns of 5-channel sounds generated by the video camera according to the embodiment.
Figure 4B:
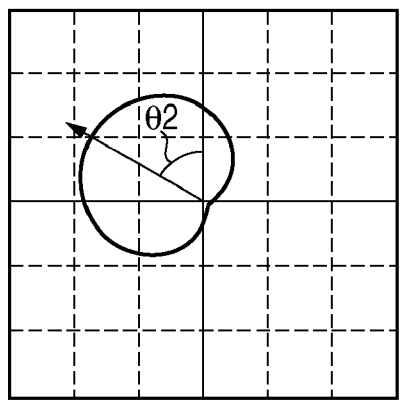
Figure 4C:
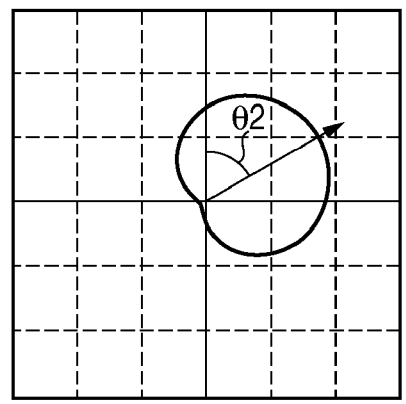
Figure 4D:
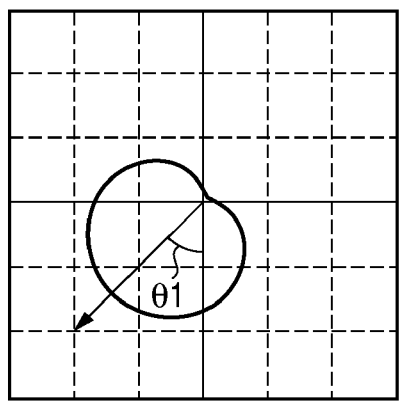
Figure 4E:
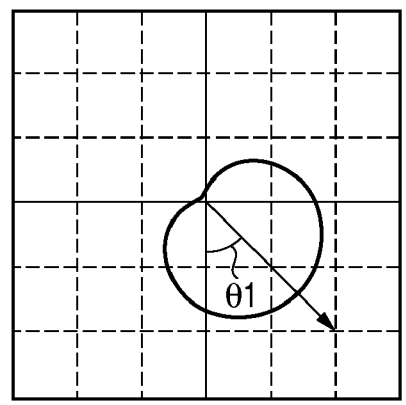

FIG. 4A shows the polar pattern of a front center channel (FC) sound calculated from the sound signal obtained from the sound collector 301 and the sound signal obtained from the sound collector 302. FIG. 4B shows the polar pattern of a front left channel (FL) sound calculated from the sound signal obtained from the sound collector 301 and the sound signal obtained from the sound collector 304. FIG. 4C shows the polar pattern of a front right channel (FR) sound calculated from the sound signal obtained from the sound collector 304 and the sound signal obtained from the sound collector 302. FIG. 4D shows the polar pattern of a surround left channel (SL) sound calculated from the sound signal obtained from the sound collector 302 and the sound signal a sound signal obtained from the sound collector 303. FIG. 4E shows the polar pattern of a surround right channel (SR) sound calculated from the sound signal obtained from the sound collector 303 and the sound signal obtained from the sound collector 301.

Thus, in the manner described above, 5-channel sound data can be generated by arranging sound correctors as shown in FIG. 3.

Such an arrangement of the four substantially non-directional sound collectors can facilitate calculation for generating surround sound signals and reduce the area of the arrangement of the four non-directional sound collectors, when generating surround sound signals. Thus, the size of the entire apparatus can be prevented from increasing.

In addition, the angle θ2 shown in FIGS. 4B and 4C corresponds to the angle θ2 in FIG. 3, and the angle θ1 shown in FIGS. 4D and 4E corresponds to the angle θ1 in FIG. 3. In other words, the directivity of the sound obtained as a calculation result can be changed by changing the arrangement of the sound collectors.

Further, in the present embodiment, the front left channel (FL) is generated from the sound signal obtained from the sound collector 301 and the sound signal obtained from the sound collector 304. However, the front left channel (FL) may be generated from a sound signal obtained from the sound collector 301 and a sound signal obtained from the sound collector 303. Further, the front right channel (FR) is generated from the sound signal obtained from the sound collector 302 and the sound signal obtained from the sound collector 304. However, the front left channel (FR) may be generated from a sound signal obtained from the sound collector 302 and a sound signal obtained from the sound collector 303. Further, the surround left channel (SL) is generated from the sound signal obtained from the sound collector 302 and the sound signal obtained from the sound collector 303. However, the surround left channel (SL) may be generated from a sound signal obtained from the sound collector 302 and a sound signal obtained from the sound collector 304. Further, the surround right channel (SR) is generated from the sound signal obtained from the sound collector 301 and the sound signal obtained from the sound collector 303. However, the surround right channel (SR) may be generated from a sound signal obtained from the sound collector 301 and a sound signal obtained from the sound collector 304.

In the present embodiment, the sound collector 303 and the sound collector 304 are disposed on the right-hand side of the line connecting the sound collector 301 and the sound collector 302 in the microphone unit 102. However, the sound collector 303 and the sound collector 304 may be disposed on the left-hand side of the line.

Further, while the generation of 5-channel multi-channel sound data has been described in the present embodiment, subchannel sound data corresponding to sounds of low-frequency components may be generated at the same time. In such a case, at least one subchannel sound data may be generated, or multiple subchannel sound signals may be generated. Moreover, channel sound data corresponding to sounds of high-frequency components of 5-channel sound data may be generated at the same time.

In addition, while the 5-channel sound data is generated in the present embodiment, further, rear center channel, left channel, and right channel sound data may be generated. Moreover, sound data may be generated for a channel between the front left channel and the left channel and for a channel between the front right channel and the right channel. Moreover, sound data may be generated for a channel between the rear channel and the surround left channel and for a channel between the rear channel and the surround right channel. These data can be calculated from the calculation method described above. The use of this method can generate 12-channel sound data.

In the present embodiment, the phase delay in the delay unit 307 is represented by the formula $\phi1=(L\omega)/c$. Thus, the delay angle will vary depending on the frequency of the sound. More specifically, for example, a low-pass filter with its cut-off frequency set to 3 kHz, and the like may be used in place of the delay unit 307. In a case in which a low-pass filter is applied, the low-pass filter may be a low-pass filter with a phase delay of the $\phi1$ ($\omega=1000\ 2\pi$) described above around the center frequency of a human auditory range, for example, around 1 kHz. Alternatively, the low-pass filter may be a low-pass filter which has frequency-phase characteristics in which the phase delay is increased toward higher frequencies.

Further, in the present embodiment, the sound collector 302 is disposed posterior to the sound collector 301 on the line substantially parallel to the optical axis of the photographing lens 101 and transmitted through the sound collector 301. However, the sound collector 302 may be simply disposed posterior to the sound collector 301.

Figure 6:
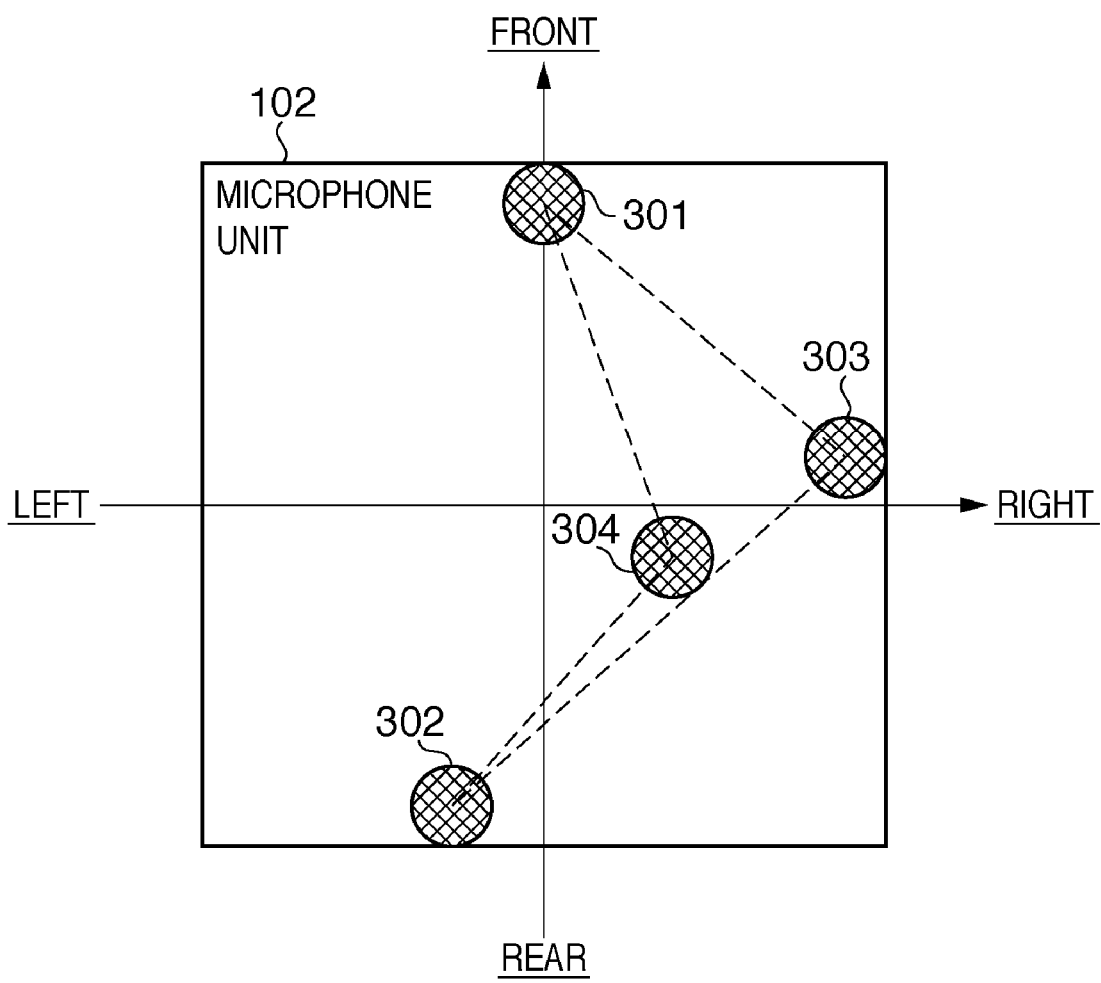
FIG. 6 is a diagram for explaining another arrangement of sound collectors of the microphone unit according to the first embodiment.

Further, in the present embodiment, the sound collector 303 is disposed at the vertex angle of the substantially isosceles triangle with the sound collector 301 and the sound collector 302 as vertexes and with the line connecting the sound collector 301 and the sound collector 302 as a base. However, the sound collector 303 may be disposed so as to form any triangle, not necessarily substantially an isosceles triangle. What is further needed is to dispose the sound collector 304 within a triangle with the sound collector 301, the sound collector 302, and the sound collector 303 as vertexes. More specifically, the arrangement of the sound collectors as shown in FIG. 6 may be employed.

As described above, it is sufficient to employ, as the arrangement of sound collectors according to the present embodiment, an arrangement which satisfies this relationship, not necessarily a precise arrangement like that shown in FIG. 3.

Second Embodiment

Now, the configurations of a microphone unit 102 and a sound processing unit 207 according to a second embodiment will be described in detail with reference to FIG. 5.

Figure 5:
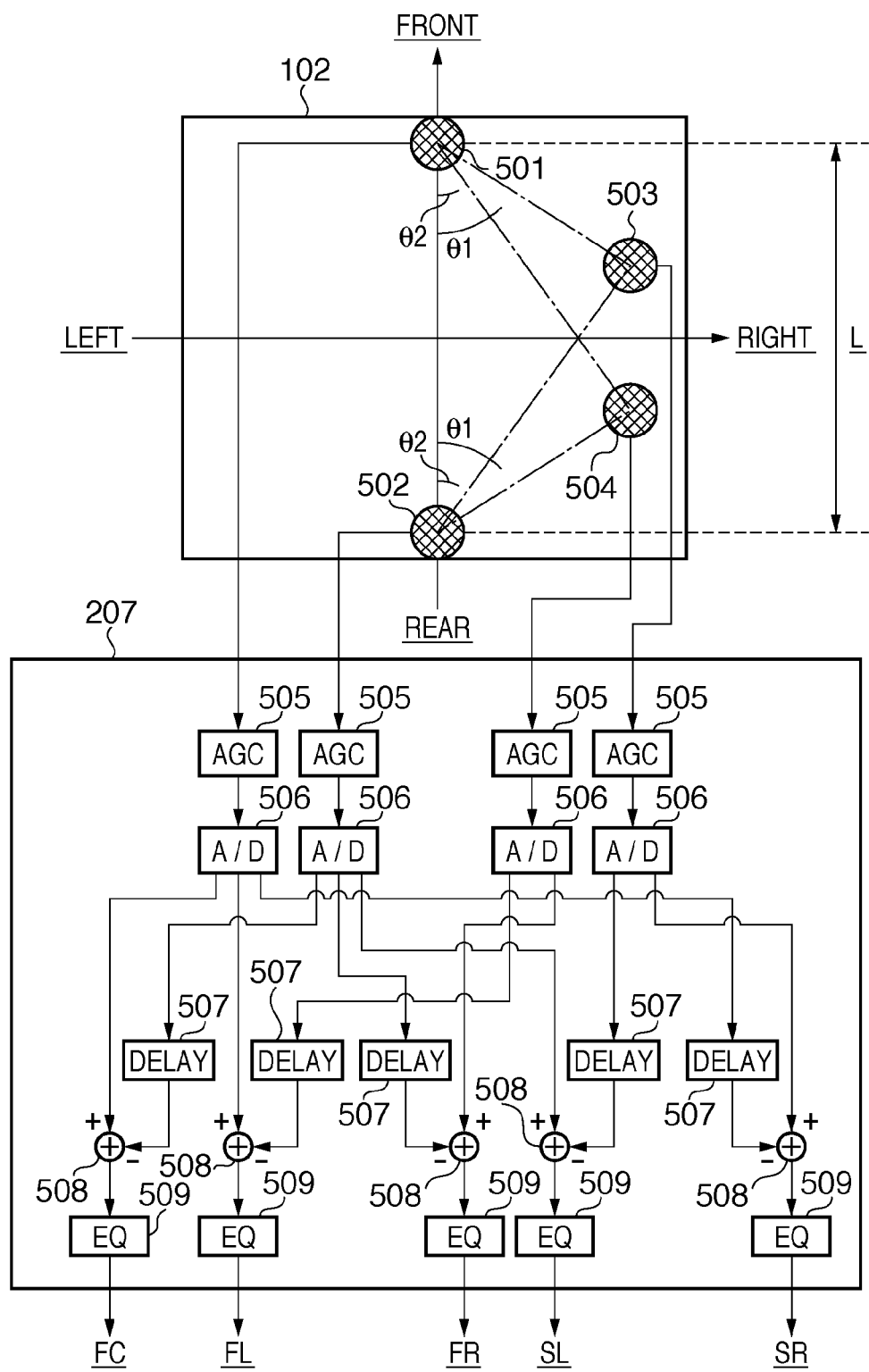
FIG. 5 is a diagram for explaining details of a microphone unit and a sound processing unit of a video camera according to a second embodiment.

FIG. 5 shows the microphone unit 102 of the video camera 100 in FIG. 1 as viewed from above. The sound processing unit 207 generates 5.1 channel surround sounds. Description of generation of subchannel sound signals corresponding to sounds of low-frequency components will be omitted here.

First, the microphone unit 102 will be described. Reference numerals 501 to 504 denote sound collectors. Each of the sound collectors has substantially non-directional sound collecting characteristics.

The sound collector 501 is anteriorly disposed in the image capturing direction of the video camera 100 in the microphone unit 102. The sound collector 502 is posteriorly disposed in the image capturing direction of the video camera 100 in the microphone unit. Further, the sound collector 502 is disposed posterior to the sound collector 501 on a line substantially parallel to the optical axis of the photographing lens 101 and transmitted through the sound collector 501, where the distance between the sound collector 501 and the sound collector 502 is denoted by L. The distance L is, for example, on the order of 20 mm.

Furthermore, a line connecting the sound collector 503 and the sound collector 504 is substantially parallel to a line connecting the sound collector 501 and the sound collector 502. Moreover, the angle made by the line connecting the sound collector 501 and the sound collector 502 and the line connecting the sound collector 501 and the sound collector 503 is substantially equal to the angle made by the line connecting the sound collector 501 and the second sound collector 502 and the line connecting the sound collector 501 and the sound collector 504.

In the present embodiment, the angle at the vertex of the sound collector 501 is denoted by θ1 in the triangle made by the sound collector 501, the sound collector 502, and the sound collector 503, and is an angle from approximately 60 degrees to approximately 80 degrees. Further, the angle at the vertex of the sound collector 501 is denoted by θ2 in the triangle made by the sound collector 501, the sound collector 502, and the sound collector 504, and is an angle of approximately 30 degrees. Thus, the angle at the vertex of the sound collector 502 is denoted by θ2 in the triangle made by the sound collector 501, the sound collector 502, and the sound collector 503. Likewise, the angle at the vertex of the sound collector 502 is denoted by θ1 in the triangle made by the sound collector 501, the sound collector 502, and the sound collector 504. It is sufficient if each of θ1 and θ2 is smaller than 90 degrees.

Furthermore, in the present embodiment, the plane made by the sound collector 501, the sound collector 502, and the sound collector 503 is made to be substantially parallel to the bottom surface of the video camera 100. In addition, the plane made by the sound collector 501, the sound collector 502, and the sound collector 504 is made to be substantially parallel to the bottom surface of the video camera 100.

Next, the sound processing unit 207 will be described. Reference numeral 505 denotes an automatic gain controller (hereinafter, referred to as an AGC) for adjusting sound signals collected by each sound collector to appropriate levels. Reference numeral 506 denotes an AD converting unit (hereinafter, referred to as A/D) for converting the sound signals adjusted by the AGC 505 to the appropriate levels, from analog data to digital data. Reference numeral 507 denotes a delay unit for delaying input sound data. Reference numeral 508 denotes a subtracter for subtracting the sound data delayed by the delay unit 507 from sound data which is not delayed. Reference numeral 509 denotes an equalizer (hereinafter, referred to as EQ) for attenuating high-frequency components.

In the sound processing unit 207 which has the configuration described above, the procedure for generating 5-channel surround sound data from sound signals obtained from the four substantially non-directional sound collectors is similar to the procedure in the first embodiment for generating 5-channel surround sound data on the basis of sound signals from the sound collectors 301 to 304, and description of the procedure will be thus omitted here.

However, in the second embodiment, a front center channel (FC) is generated from a sound signal obtained from the sound collector 501 and a sound signal obtained from the sound collector 502. A front left channel (FL) is generated from a sound signal obtained from the sound collector 501 and a sound signal obtained from the sound collector 504. A front right channel (FR) is generated from a sound signal obtained from the sound collector 502 and a sound signal obtained from the sound collector 503. A surround left channel (SL) is generated from a sound signal obtained from the sound collector 502 and a sound signal obtained from the sound collector 503. A surround right channel (SR) is generated from a sound signal obtained from the sound collector 501 and a sound signal obtained from the sound collector 503.

As described above, the arrangement of the four substantially non-directional sound collectors, shown in FIG. 5, can facilitate calculation for generating surround sound signals and reduce the area of the arrangement of the four non-directional sound collectors, when surround sound signals are generated. Thus, the size of the entire apparatus can be prevented from increasing. Further, the arrangement allows the front left and front right channels to have higher directivity than the directivity of the surround left and surround right channels.

Further, the arrangement in which the directivity of the front left and front right channels is made higher than the directivity of the surround left and surround right channels allows the longest distance between the sound collectors to be reduced, thereby allowing the channel (the front center channel in the present embodiment) calculated with the use of the sound collectors with the longest distance therebetween to be stabilized for directional characteristics at a high frequency region. Moreover, each of the front left, front right, surround left, and surround right channels can have an appropriate directional angle. More specifically, sounds can be generated for a channel which has a directional angle close to an angle determined on the basis of ITU recommendation (ITU-R BS.775-1).

In addition, the angle θ2 shown in FIGS. 4B and 4C corresponds to the angle θ2 in FIG. 3, and the angle θ1 shown in FIGS. 4D and 4E corresponds to the angle θ1 in FIG. 3. In other words, the directivity of the sound obtained as a calculation result can be changed by changing the arrangement of the sound collectors. The angles θ1 and θ2 are angles determined on the basis of ITU recommendation (ITU-R BS.775-1), and in the present embodiment, θ1 is approximately 50 degrees, whereas θ2 is approximately between 60 degrees and 80 degrees. However, the angles θ1 and θ2 may be changed on the basis of the ITU recommendation.

Further, in the present embodiment, the front left channel (FL) is generated from the sound signal obtained from the sound collector 501 and the sound signal obtained from the sound collector 504. However, the front left channel (FL) may be generated from a sound signal obtained from the sound collector 501 and a sound signal obtained from the sound collector 503. Further, the front right channel (FR) is generated from the sound signal obtained from the sound collector 503 and the sound signal obtained from the sound collector 502. However, the front right channel (FR) may be generated from a sound signal obtained from the sound collector 504 and a sound signal obtained from the sound collector 502. Further, the surround left channel (SL) is generated from the sound signal obtained from the sound collector 502 and the sound signal obtained from the sound collector 504. However, the surround left channel (SL) may be generated from a sound signal obtained from the sound collector 502 and a sound signal obtained from the sound collector 503. Further, the surround right channel (SR) is generated from the sound signal obtained from the sound collector 503 and the sound signal obtained from the sound collector 501. However, the surround right channel (SR) may be generated from a sound signal obtained from the sound collector 504 and a sound signal obtained from the sound collector 501. This signal generation allows the surround left and surround right channels to have higher directivity than the directivity of the front left and front right channels.

In the present embodiment, the sound collector 503 and the sound collector 504 are disposed on the right-hand side of the line connecting the sound collector 501 and the sound collector 502 in the microphone unit 102. However, the sound collector 503 and the sound collector 504 may be disposed on the left-hand side of the line. In this case, the front center channel (FC) is generated from a sound signal obtained from the sound collector 501 and a sound signal obtained from the sound collector 503. The front left channel (FL) is generated from a sound signal obtained from the sound collector 503 and a sound signal obtained from the sound collector 502. The front right channel (FR) is generated from a sound signal obtained from the sound collector 501 and a sound signal obtained from the sound collector 504. The surround left channel (SL) is generated from a sound signal obtained from the sound collector 503 and a sound signal obtained from the sound collector 501. The surround right channel (SR) is generated from a sound signal obtained from the sound collector 502 and a sound signal obtained from the sound collector 504.

Further, while the generation of 5-channel multi-channel sound data has been described in the present embodiment, subchannel sound data corresponding to sounds of low-frequency components may be generated at the same time. In such a case, at least one subchannel sound data may be generated, or multiple subchannel sound signals may be generated. Moreover, channel sound data corresponding to sounds of high-frequency components of 5-channel sound data may be generated at the same time.

Further, while the 5-channel sound data is generated in the present embodiment, rear center channel sound data may be further generated. Moreover, sound data may be generated for a channel between the front left channel and the surround left channel and for a channel between the front right channel and the surround right channel. Moreover, sound data may be generated for a channel between the rear channel and the surround left channel and for a channel between the rear channel and the surround right channel. This data can be calculated from the calculation method described above. The use of this method can generate 10-channel sound data.

In the present embodiment, the phase delay in the delay unit 507 is represented by the formula $\phi 1=(L\omega)/c$. Thus, the delay angle will vary depending on the frequency of the sound. More specifically, for example, a low-pass filter with its cut-off frequency set to 3 kHz, and the like may be used in place of the delay unit 507. In a case in which a low-pass filter is applied, the low-pass filter may be a low-pass filter with a phase delay of the $\phi 1$ ($\omega=1000\,2\pi$) described above around the center frequency of a human auditory range, for example, around 1 kHz. Alternatively, the low-pass filter may be a low-pass filter which has frequency-phase characteristics in which the phase delay is increased toward higher frequencies.

In the present embodiment, the sound collector 502 is disposed posterior to the sound collector 501 on the line substantially parallel to the optical axis of the photographing lens 101 and transmitted through the sound collector 501. Alternatively, the sound collector 502 may be disposed posterior to the sound collector 501.

Further, in the present embodiment, the line connecting the sound collector 503 and the sound collector 504 is substantially parallel to the line connecting the sound collector 501 and the sound collector 502, and moreover, the angle made by the line connecting the sound collector 501 and the sound collector 502 and the line connecting the sound collector 501 and the sound collector 503 is substantially equal to the angle made by the line connecting the sound collector 501 and the second sound collector 502 and the line connecting the sound collector 501 and the sound collector 504. However, the line connecting the sound collector 503 and the sound collector 504 need not necessarily be parallel to the line connecting the sound collector 501 and the sound collector 502, because all that is needed is to dispose both the sound collectors 503 and 504 together on the left-hand or right-hand side of the line connecting the sound collector 501 and the sound collector 502, and to displace the sound collectors 503 and 504 in the anterior-posterior direction.

Figure 7:
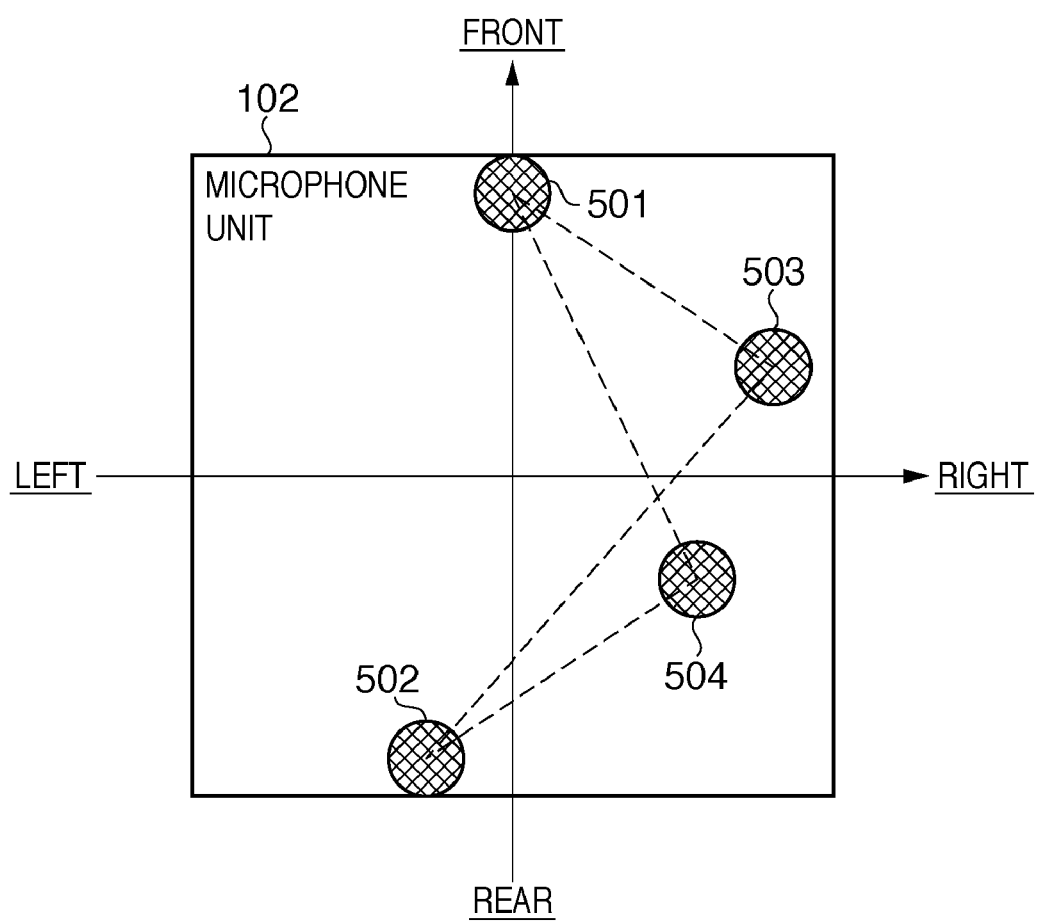
FIG. 7 is a diagram for explaining another arrangement of sound collectors of the microphone unit according to the second embodiment.

More specifically, the arrangement of the sound collectors as shown in FIG. 7 may be employed.

As described above, it is sufficient to employ, as the microphone arrangement according to the present embodiment, an arrangement which satisfies this relationship, and not necessarily a precise arrangement like that shown in FIG. 5.

While the present invention has been described in the embodiments with reference to the video camera as an apparatus which has the function of collecting sounds, other apparatuses may be employed.

Further, needless to say, the object of the present invention is also achieved by supplying, to a system or an apparatus, a storage medium on which a program code of software for achieving the function described previously in the embodiment has been recorded. In this case, a computer (or a CPU or MPU) of the system or apparatus to which the program code has been applied reads out and executes the program code stored in the storage medium.

In this case, the program code itself read from the storage medium will achieve the function described previously in the embodiment, and the program code itself and the storage medium with the program code stored thus constitute the present invention.

As the storage medium for supplying the program code, for example, flexible disks, hard disks, optical disks, magneto-optical disks, CD-ROM, CD-R, magnetic tapes, nonvolatile memory cards, ROM, and the like can be used.

Furthermore, needles to say, the present invention also includes cases in which on the basis of requests of the program code described above, an OS (a basic system or an operating system) operating on a computer, or the like partially or entirely carries out processing, which achieves the function described previously in the embodiment.

Furthermore, needles to say, the present invention also includes cases in which the program code read from the storage medium is written into an extensions board inserted in a computer or into a memory provided in an extensions unit connected to a computer to achieve the function described previously in the embodiment. In this case, on the basis of requests of the program code, a CPU or the like provided in the extensions board or the extensions unit partially or entirely carries out actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-320957 filed Dec. 12, 2007, and 2007-320958 filed Dec. 12, 2007, which are hereby incorporated by reference herein in their entirety.

The invention claimed is:

1. An image capturing apparatus including an image capturing unit for capturing an optical image of a subject ahead, the image capturing apparatus comprising:
a microphone unit for collecting a surround sound; and
a generator for generating a multi-channel sound signal, based on a sound collected by the microphone unit,
wherein the microphone unit comprises a first sound collector, a second sound collector disposed posterior to the first sound collector, a third sound collector, and a fourth sound collector, and the fourth sound collector is disposed inside a triangle formed by the first sound collector, the second sound collector, and the third sound collector as vertexes, and
wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the fourth sound collector and a sound signal of a sound collected by the second sound collector, generates a fourth channel sound signal from a sound signal of a sound collected by the second sound collector and a sound signal of a sound collected by the third sound collector, and generates a fifth channel sound signal from a sound signal of a sound collected by the third sound collector and a sound signal of a sound collected by the first sound collector.

2. The image capturing apparatus according to claim 1, wherein the triangle with the first sound collector, the second sound collector, and the third sound collector as vertexes is substantially an isosceles triangle.

3. The image capturing apparatus according to claim 1, wherein the triangle with the first sound collector, the second sound collector, and the fourth sound collector as vertexes is substantially an isosceles triangle.

4. The image capturing apparatus according to claim 1, wherein the vertex of the triangle with the first sound collector, the second sound collector, and the third sound collector as vertexes, at which the first sound collector is disposed, has an angle of approximately 50 degrees, and wherein the vertex of the triangle with the first sound collector, the second sound collector, and the fourth sound collector as vertexes, at which the first sound collector is disposed, has an angle approximately between 60 degrees and 80 degrees.

5. The image capturing apparatus according to claim 1, wherein each of the first sound collector, the second sound collector, the third sound collector, and the fourth sound collector has substantially non-directional sound collecting characteristics.

6. The image capturing apparatus according to claim 1, wherein the microphone unit is disposed on an upper surface of the image capturing apparatus.

7. The image capturing apparatus according to claim 1, wherein a line connecting the first sound collector and the second sound collector is substantially parallel to an optical axis of the image capturing unit.

8. The image capturing apparatus according to claim 1, wherein the generator generates a front center channel sound signal from a sound signal of a sound collected by the first sound collector and a sound signal of a sound collected by the second sound collector, generates a front left channel sound signal from a sound signal of a sound collected by the first sound collector and a sound signal of a sound collected by the fourth sound collector, generates a front right channel sound signal from a sound signal of a sound collected by the fourth sound collector and a sound signal of a sound collected by the second sound collector, generates a surround left channel sound signal from a sound signal of a sound collected by the second sound collector and a sound signal of a sound collected by the third sound collector, and generates a surround right channel sound signal from a sound signal of a sound collected by the third sound collector and a sound signal of a sound collected by the first sound collector.

9. The image capturing apparatus according to claim 1, wherein the generator generates a front center channel sound signal from a sound signal of a sound collected by the first sound collector and a sound signal of a sound collected by the second sound collector, generates a surround right channel sound signal from a sound signal of a sound collected by the first sound collector and a sound signal of a sound collected by the fourth sound collector, generates a surround left channel sound signal from a sound signal of a sound collected by the fourth sound collector and a sound signal of a sound collected by the second sound collector, generates a front right channel sound signal from a sound signal of a sound collected by the second sound collector and a sound signal of a sound collected by the third sound collector, and generates a front left channel sound signal from a sound signal of a sound collected by the third sound collector and a sound signal of a sound collected by the first sound collector.

10. The image capturing apparatus according to claim 1, wherein a plane formed by the first sound collector, the second sound collector, and the third sound collector is substantially parallel to a bottom surface of the image capturing apparatus.

11. The image capturing apparatus according to claim 1, wherein a plane formed by the first sound collector, the second sound collector, and the fourth sound collector is substantially parallel to a bottom surface of the image capturing apparatus.

12. An image capturing apparatus including an image capturing unit for capturing an optical image of a subject ahead, the image capturing apparatus comprising:
a microphone unit for collecting a surround sound; and
a generator for generating a multi-channel sound signal, based on a sound collected by the microphone unit,
wherein the microphone unit comprises a first sound collector, a second sound collector disposed posterior to the first sound collector, and a third sound collector and a fourth sound collector both disposed on the right-hand or left-hand side of a line connecting the first sound collector and the second sound collector, the third sound collector and the fourth sound collector disposed with displacement in the anterior-posterior direction, and
wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the third sound collector and a sound signal of a sound collected by the second sound collector, generates a fourth channel sound signal from a sound signal of a sound collected by the second sound collector and a sound signal of a sound collected by the fourth sound collector, and generates a fifth channel sound signal from a sound signal of a sound collected by the third sound collector and a sound signal of a sound collected by the first sound collector.

13. The image capturing apparatus according to claim 12, wherein a line connecting the third sound collector and the fourth sound collector is substantially parallel to the line connecting the first sound collector and the second sound collector, the line connecting the third sound collector and the fourth sound collector is shorter than the line connecting the first sound collector and the second sound collector, and an angle made by the line connecting the first sound collector and the second sound collector and the line connecting the first sound collector and the third sound collector is substantially equal to an angle made by the line connecting the first sound collector and the second sound collector and the line connecting the second sound collector and the fourth sound collector.

14. The image capturing apparatus according to claim 12, wherein a vertex of a triangle formed by the first sound collector, the second sound collector, and the fourth sound collector as vertexes, at which the first sound collector is disposed, has an angle of approximately 50 degrees, and wherein a vertex of a triangle formed by the first sound collector, the second sound collector, and the third sound collector as vertexes, at which the first sound collector is disposed, has an angle approximately between 60 degrees and 80 degrees.

15. The image capturing apparatus according to claim 12, wherein the vertex of the triangle with the first sound collector, the second sound collector, and the third sound collector as vertexes, at which the first sound collector is disposed, has an angle of approximately 50 degrees, and wherein the vertex of the triangle with the first sound collector, the second sound collector, and the fourth sound collector as vertexes, at which the first sound collector is disposed, has an angle approximately between 60 degrees and 80 degrees.

16. The image capturing apparatus according to claim 12, wherein the generator generates a front center channel sound signal from a sound signal of a sound collected by the first sound collector and a sound signal of a sound collected by the second sound collector, generates a front left channel sound signal from a sound signal of a sound collected by the first sound collector and a sound signal of a sound collected by the fourth sound collector, generates a front right channel sound signal from a sound signal of a sound collected by the third sound collector and a sound signal of a sound collected by the second sound collector, generates a surround left channel sound signal from a sound signal of a sound collected by the second sound collector and a sound signal of a sound collected by the fourth sound collector, and generates a surround right channel sound signal from a sound signal of a sound collected by the third sound collector and a sound signal of a sound collected by the first sound collector.

17. The image capturing apparatus according to claim 12, wherein the generator generates a front center channel sound signal from a sound signal of a sound collected by the first sound collector and a sound signal of a sound collected by the second sound collector, generates a front left channel sound signal from a sound signal of a sound collected by the first sound collector and a sound signal of a sound collected by the third sound collector, generates a front right channel sound signal from a sound signal of a sound collected by the fourth sound collector and a sound signal of a sound collected by the second sound collector, generates a surround left channel sound signal from a sound signal of a sound collected by the second sound collector and a sound signal of a sound collected by the third sound collector, and generates a surround right channel sound signal from a sound signal of a sound collected by the fourth sound collector and a sound signal of a sound collected by the first sound collector.

18. The image capturing apparatus according to claim 12, wherein the generator generates a front center channel sound signal from a sound signal of a sound collected by the first sound collector and a sound signal of a sound collected by the second sound collector, generates a front right channel sound signal from a sound signal of a sound collected by the first sound collector and a sound signal of a sound collected by the fourth sound collector, generates a front left channel sound signal from a sound signal of a sound collected by the third sound collector and a sound signal of a sound collected by the second sound collector, generates a surround right channel sound signal from a sound signal of a sound collected by the second sound collector and a sound signal of a sound collected by the fourth sound collector, and generates a surround left channel sound signal from a sound signal of a sound collected by the third sound collector and a sound signal of a sound collected by the first sound collector.

19. The image capturing apparatus according to claim 12, wherein the generator generates a front center channel sound signal from a sound signal of a sound collected by the first sound collector and a sound signal of a sound collected by the second sound collector, generates a front right channel sound signal from a sound signal of a sound collected by the first sound collector and a sound signal of a sound collected by the third sound collector, generates a front left channel sound signal from a sound signal of a sound collected by the fourth sound collector and a sound signal of a sound collected by the second sound collector, generates a surround right channel sound signal from a sound signal of a sound collected by the second sound collector and a sound signal of a sound collected by the third sound collector, and generates a surround left channel sound signal from a sound signal of a sound collected by the fourth sound collector and a sound signal of a sound collected by the first sound collector.

20. The image capturing apparatus according to claim 12, wherein each of the first sound collector, the second sound collector, the third sound collector, and the fourth sound collector has substantially non-directional sound collecting characteristics.

21. The image capturing apparatus according to claim 12, wherein the microphone unit is disposed on an upper surface of the image capturing apparatus.

22. The image capturing apparatus according to claim 12, wherein a plane formed by the first sound collector, the second sound collector, and the third sound collector is substantially parallel to a bottom surface of the image capturing apparatus.

23. The image capturing apparatus according to claim 12, wherein a plane formed by the first sound collector, the second sound collector, and the fourth sound collector is substantially parallel to a bottom surface of the image capturing apparatus.

24. An image capturing apparatus including an image capturing unit for capturing an optical image of a subject ahead, the image capturing apparatus comprising:
a microphone unit for collecting a surround sound; and
a generator for generating a multi-channel sound signal, based on a sound collected by the microphone unit, wherein the microphone unit comprises a first sound collector, a second sound collector disposed posterior to the first sound collector, a third sound collector, and a fourth sound collector, and wherein the generator generates a first channel sound signal from a sound signal of a sound collected by the first sound collector and a sound signal of a sound collected by the second sound collector, generates a second channel sound signal from a sound signal of a sound collected by the first sound collector and a sound signal of a sound collected by the fourth sound collector, generates a third channel sound signal from a sound signal of a sound collected by the fourth sound collector and a sound signal of a sound collected by the second sound collector, generates a fourth channel sound signal from a sound signal of a sound collected by the second sound collector and a sound signal of a sound collected by the third sound collector, and generates a fifth channel sound signal from a sound signal of a sound collected by the third sound collector and a sound signal of a sound collected by the first sound collector.

\* \* \* \* \*